United States Patent
Nortman et al.

(10) Patent No.: US 12,093,038 B2
(45) Date of Patent: Sep. 17, 2024

(54) METHOD AND SYSTEM FOR REAL-TIME DIAGNOSTICS AND FAULT MONITORING IN A ROBOTIC SYSTEM

(71) Applicant: Argo AI, LLC, Pittsburgh, PA (US)

(72) Inventors: Randall Nortman, Pittsburgh, PA (US); Michael Dacko, Oakmont, PA (US)

(73) Assignee: Argo AI, LLC, Pittsburgh, PA (US)

( * ) Notice: Subject to any disclaimer, the term of this patent is extended or adjusted under 35 U.S.C. 154(b) by 430 days.

(21) Appl. No.: 17/509,136

(22) Filed: Oct. 25, 2021

(65) Prior Publication Data
US 2022/0043445 A1 Feb. 10, 2022

Related U.S. Application Data

(63) Continuation of application No. 16/403,943, filed on May 6, 2019, now Pat. No. 11,209,817.

(51) Int. Cl.
*G07C 5/02* (2006.01)
*G05D 1/00* (2006.01)
*G07C 5/08* (2006.01)

(52) U.S. Cl.
CPC ......... *G05D 1/0061* (2013.01); *G05D 1/0088* (2013.01); *G07C 5/02* (2013.01); *G07C 5/08* (2013.01)

(58) Field of Classification Search
CPC ...... G05D 1/0061; G05D 1/0088; G07C 5/02; G07C 5/08; G07C 5/0808
See application file for complete search history.

(56) References Cited

U.S. PATENT DOCUMENTS

| | | | |
|---|---|---|---|
| 4,975,865 A | 12/1990 | Carrette et al. | |
| 5,798,918 A | 8/1998 | Georgiou et al. | |
| 7,351,111 B2 * | 4/2008 | Cheng | H01R 27/02 439/668 |

(Continued)

FOREIGN PATENT DOCUMENTS

| | | |
|---|---|---|
| CN | 102042909 A | 5/2011 |
| CN | 102292683 A | 12/2011 |

(Continued)

OTHER PUBLICATIONS

CN108760302A translation (Year: 2018).*

(Continued)

*Primary Examiner* — Frederick M Brushaber
(74) *Attorney, Agent, or Firm* — Fox Rothschild LLP (57) ABSTRACT

Disclosed herein are systems, methods, and computer program products for operating a robotic system. For example, the methods include by a processor: receiving a plurality of first signals that each comprise data produced by at least two sources of the robotic system and first keys respectively defined by identifiers for the at least two sources; generating second signals derived from the plurality of signals; combining second keys of the second signals to produce a third key; detecting an existence of an operational condition in the robotic system when the third key has a value different than an expected value; and causing a given action to be taken by the robotic system responsive to the existence of the operational condition.

21 Claims, 9 Drawing Sheets

(56) References Cited

U.S. PATENT DOCUMENTS

| | | | |
|---|---|---|---|
| 7,991,583 B2* | 8/2011 | Balzer | F02D 11/107 |
| | | | 702/183 |
| 8,032,862 B2 | 10/2011 | Bognar | |
| 8,073,670 B2 | 12/2011 | Kimata | |
| 9,071,436 B2* | 6/2015 | Jung | H04L 9/32 |
| 9,242,372 B2* | 1/2016 | Laurent | G05B 19/409 |
| 9,728,014 B2 | 8/2017 | Khalaschi et al. | |
| 10,166,994 B1 | 1/2019 | Fields et al. | |
| 10,189,489 B2 | 1/2019 | Wang et al. | |
| 10,589,428 B1* | 3/2020 | Linnell | B25J 13/06 |
| 11,354,473 B1* | 6/2022 | Ziglar | G06F 9/5027 |
| 11,650,585 B1* | 5/2023 | Aschbacher | G07C 5/0816 |
| | | | 701/29.2 |
| 11,734,911 B2* | 8/2023 | Ramsay | G06T 7/48 |
| 2003/0018928 A1* | 1/2003 | James | G05B 23/0254 |
| | | | 714/E11.158 |
| 2007/0249216 A1* | 10/2007 | Cheng | H01R 31/06 |
| | | | 439/490 |
| 2007/0283188 A1* | 12/2007 | Balzer | B60W 50/045 |
| | | | 714/26 |
| 2015/0241853 A1 | 8/2015 | Vechart et al. | |
| 2018/0050704 A1 | 2/2018 | Tascione et al. | |
| 2018/0225891 A1 | 8/2018 | Lambourne et al. | |
| 2019/0180526 A1 | 6/2019 | Mehdizade et al. | |
| 2020/0357199 A1* | 11/2020 | Nortman | G05B 23/0221 |

FOREIGN PATENT DOCUMENTS

| | | | |
|---|---|---|---|
| CN | 102637019 A | | 8/2012 |
| CN | 102830671 A | | 12/2012 |
| CN | 103471849 A | | 12/2013 |
| CN | 107942854 A | | 4/2018 |
| CN | 108760302 A | * | 5/2018 |
| CN | 109491341 A | | 3/2019 |
| DE | 102009011157 A1 | | 10/2010 |
| EP | 0959398 A1 | | 11/1999 |
| JP | S6116307 A | | 1/1986 |
| JP | 2010218492 A | | 9/2010 |

OTHER PUBLICATIONS

Christensen, A.L. et al., "Fault detection in autonomous robots based on fault injection and learning", Auton Robot (2008) 24:49-67.

Feyzi, F. et al., "Inforence: Effective Fault Localization Based on Information—Theoretic Analysis and Statistical Causal Inference", Frontiers of Computer Science, Dec. 2017.

Sun, S., "Statistical Fault Localization and Causal Interactions", Case Western Reserve University, Jan. 2017.

Information about Related Patents and Patent Applications, see section 6 of the accompanying Information Disclosure Statement Letter, which concerns Related Patents and Patent Applications.

U.S. Appl. No. 16/403,937, filed May 6, 2019, Method and System for Real-Time Diagnostics and Fault Monitoring in a Robotic System.

U.S. Appl. No. 16/403,943, filed May 6, 2019, Method and System for Real-Time Diagnostics and Fault Monitoring in a Robotic System.

Office Action for Chinese Patent Application No. 202010371703.0 dated May 6, 2023, 18 pages.

* cited by examiner

METHOD AND SYSTEM FOR REAL-TIME DIAGNOSTICS AND FAULT MONITORING IN A ROBOTIC SYSTEM

CROSS-REFERENCE AND CLAIM OF PRIORITY

This patent application claims priority to U.S. patent application Ser. No. 16/403,943 filed May 6, 2019, which is incorporated herein in its entirety.

BACKGROUND

For safety purposes, an autonomous vehicle system (AVS) must collect and analyze data about its own status and performance so that it can detect and report faults in real-time, and so that it can appropriately react to faults when detected. It is also useful for operators of autonomous vehicle fleets to collect performance metrics from a variety of vehicles across the fleet in order to efficiently gather data about the operation of the vehicle.

For these and other purposes, the AVS must measure thousands of different operational parameters from various sensors and at varying rates. For safety monitoring, these parameters must be collected and analyzed in real time with very low latency in order to identify and react to faults. In addition, fault detection typically requires multiple parameters to be considered holistically. One parameter alone may not be sufficient to determine that a fault has occurred. Instead, in most situations multiple parameters must be considered together in one or more formulas or equations to recognize a fault.

When an AVS determines that a fault has occurred, the system (either the AVS itself or an offline system) may need to determine the root cause of the fault. Given that thousands of parameters may contribute to the fault, the task of identifying which parameters and subsystems actually caused the fault is not a trivial computational task, and it may require a significant amount of processing power, data retention, and time.

This document describes methods and systems that are directed to addressing the problems described above, and/or other issues.

SUMMARY

The present disclose concerns implementing systems and methods for operating a robotic system. The methods comprise: receiving, by a processor, a plurality of first signals that each comprise data produced by at least two sources of the robotic system and first keys respectively defined by identifiers for the at least two sources; generating, by the processor, second signals derived from the plurality of signals; combining, by the processor, second keys of the second signals to produce a third key; detecting, by the processor, an existence of an operational condition in the robotic system when the third key has a value different than an expected value; and causing, by the processor, a given action to be taken by the robotic system responsive to the existence of the operational condition.

In some scenarios, the at least two sources comprise different processes running on the robotic system or different electronic devices internal to the robotic system. The the third key may be a sum of the second keys, a minimum key of the second keys, a maximum key of the second keys, or a mean of the second keys. The generating may comprise performing a given function to produce each of the second signals based on one of the first keys that is different than ones of the first keys used to produce other said second signals. The given action may comprise transitioning operational modes of the robotic system, disabling certain operations of the robotic system, or movement of at least a portion of the robotic system.

The method may further involve identifying, by the processor from the at least two sources, a source that caused the existence of the operational condition using a causal trace. The identifying can comprise comparing a processing latency of the causal trace to a threshold value or comparing an uncertainty value in the causal trace to a threshold value. The causal trace can comprise only sources of the at least two sources that are causal to the existence of the operational condition. The at least two sources may be provided in different formats to indicate relative levels of causality for the existence of the operational condition. The levels of causality may comprise causal and non-causal.

The present document also concerns a robotic device such as an autonomous vehicle includes various hardware components and a various computational processes, each of which is operable to perform one or more tasks. The robotic device includes a diagnostic service that includes a processor and programming instructions that are operable to cause the diagnostics service to monitor operations of the tasks. In an autonomous vehicle, the diagnostic service may be an on-board vehicle diagnostics system, for example. The diagnostic service will receive primary signals from the tasks. At least one of the primary signals will be a keyed signal that is associated with a key having multiple valences. For each of the primary signals, the diagnostic service will perform a first instance of a function on the primary signal to create a first derived signal for the primary signal, and it may save the first instance of the function to a memory. For each of the primary signals that is a keyed signal, the diagnostic service will identify the first instance of the function as being associated with a first valence of the key. For each additional valence of the key, the diagnostic service will create an additional instance of the function to create an additional derived signal for each additional valence, and it may save each additional instance to the memory. The diagnostic service will use the first instance of the function and each additional instance of the function to create an aggregated signal. The diagnostic service also will use the aggregated signal to simultaneously monitor each of the hardware components and computational processes operating on the robotic device.

Optionally, when creating the aggregated signal, the diagnostic service may identify expiration times for one or more of the primary signals, determine which of the identified expiration times of the primary signals is a minimum value, and assign the minimum value to be an expiration time for the aggregated signal.

Optionally, during runtime of the robotic device, the diagnostic service may receive an updated value for one or more of the keyed signals and use each updated value to generate an updated aggregated signal in real time.

Optionally, when performing the first instance of the function on at least one of the primary signals to create a first derived signal, the diagnostic service may access a configuration file, extract a first instance of a key for the primary signal from the configuration file, and use the first instance of the key for the primary signal in the first instance of the function. In addition, for at least one of the primary signals that is a keyed signal, the diagnostic service may do the following for each of the additional valences of the key: (i) access the configuration file; (ii) extract an additional instance of the key for the primary signal that is a keyed signal; and (iii) use the additional instance of the key and performing the additional instance of the function on that primary signal to create an additional derived signal with the additional instance of the key.

Optionally, the diagnostic service may store an algorithm for the function in a memory of the robotic device prior to runtime as part of executable code. Then, at runtime the diagnostic service may load the configuration file to receive configuration variables to use with the function.

Optionally, upon detecting a fault in the robotic device, the diagnostic service may use the aggregated signal to determine a cause of the fault and cause the robotic device to take a safety-related action in response to the fault.

In other embodiments, in a method of determining a cause of a fault in a robotic system, a diagnostic service of the robotic system will receive primary signals from various processes running on the robotic system. The diagnostic service may access a graph representation of functions as stored in memory, and it will perform the functions on one or more of the primary signals to yield one or more derived signals. A sink of the robotic system will then subscribe to a causal trace. The causal trace includes a value for a specified derived signal of the derived signals, as well as an identification of each signal from which the specified signal was derived, During runtime, the sink will receive updates to the causal trace as the value for the specified derived signal changes. Upon detection of a fault in the robotic system, the diagnostic service will use the causal trace to identify a process that caused the fault.

Optionally, in this embodiment, when the diagnostic service uses the causal trace to identify a process that caused the fault, the diagnostic service may: (a) determine whether a processing latency in the causal trace exceeds a threshold time value; and/or (b) determine whether an uncertainty in the causal trace exceeds a threshold value.

Optionally, the causal trace may include a trigger, and the sink may only receive updates to the causal trace when: (a) the value for the specified derived signal changes; and (b) the trigger is active.

Optionally, the diagnostic service may store algorithms for the functions prior to runtime as part of executable code, and the diagnostic service may load the configuration file to receive configuration variables to use with the functions at runtime.

Optionally, when the diagnostic service detects a fault in the robotic system, it may use the aggregated signal to determine a cause of the fault, and it may cause the robotic system to take a safety-related action in response to the fault. For example, if the robotic system is a vehicle, the safety-related action may include: (a) if the vehicle is operating in an autonomous mode when the fault is detected, preventing the vehicle from entering the autonomous mode; or (b) if the vehicle is operating in the autonomous mode when the fault is detected, causing the vehicle to exit the autonomous mode.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
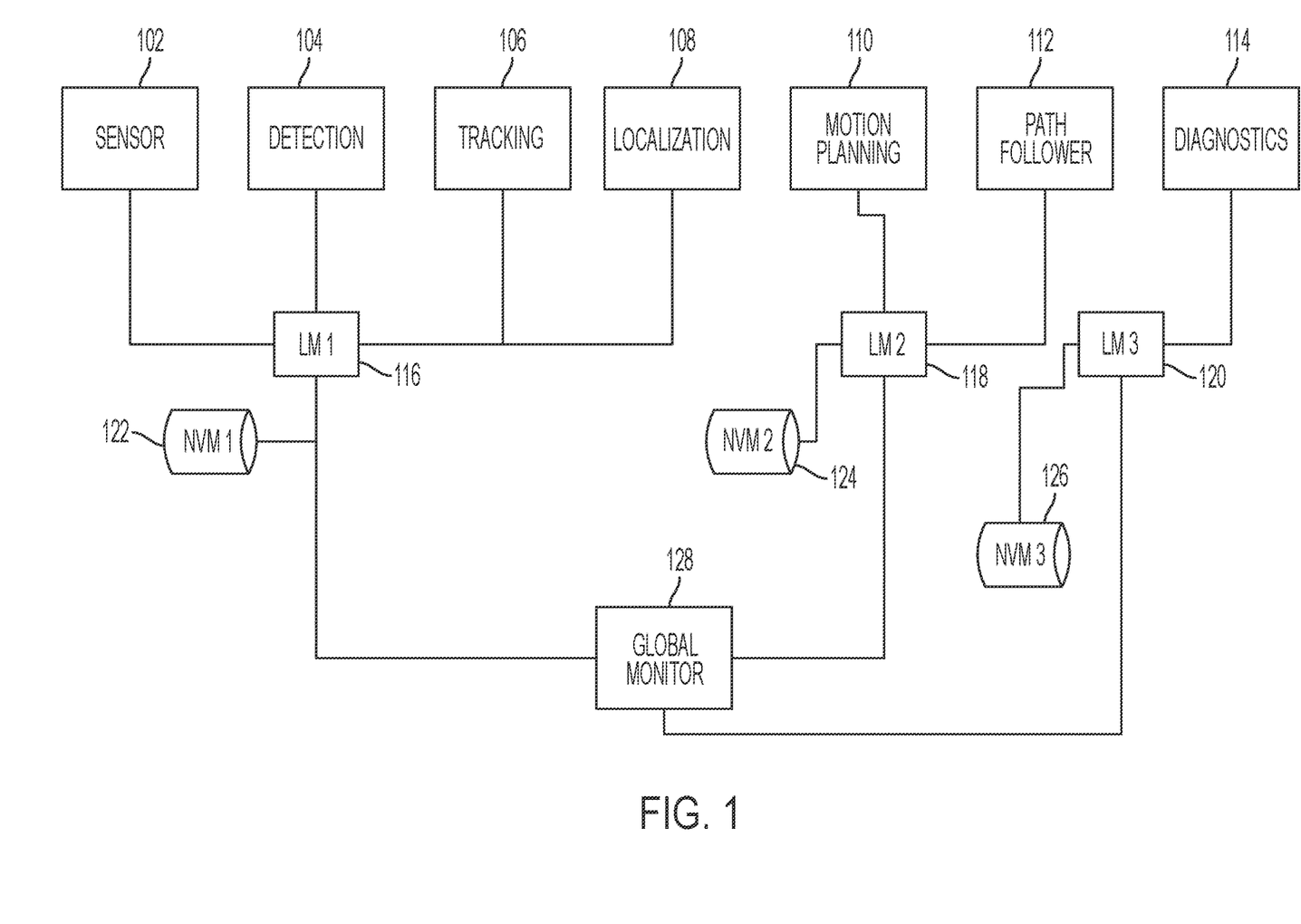
FIG. 1 illustrates example components of a robotic device monitoring system.

FIG. 1 illustrates an example monitoring system for one or more systems of a robotic device according to an embodiment. As illustrated by FIG. 1, a monitoring system may include one or more subsystems that are responsible for performing one or more types of tasks or functions. For example, FIG. 1 illustrates a monitoring system 100 with a sensor subsystem 102, a detection subsystem 104, a tracking subsystem 106, a localization subsystem 108, a motion planning subsystem 110, a path follower subsystem 112 and a diagnostics service subsystem 114.

As illustrated in FIG. 1, the subsystems may be in communication with a local monitor 116, 118, 120. A local monitor 116, 118, 120 may be implemented using hardware, software or a combination of hardware. For instance, a local monitor 116, 118, 120 may be implemented as part of a microcontroller. A local monitor 116, 118, 120 may include one or more of a register or data store for temporarily storing data, a comparator for comparing data, programmed circuitry for performing one or more cryptographic operations and/or the like. A local monitor 116, 118, 120 may receive data pertaining to one or more functions executed by a subsystem, and may use this information to verify at least a portion of the execution flow to which the function(s) pertain as explained in more detail below.

FIG. 1 also illustrates example non-volatile memory (NVM) 122, 124, 126, which may be used to store information, as discussed in more detail throughout this disclosure. In various embodiments, each NVM 122, 124, 126 may include a master hash table. A master hash table refers to a data structure that stores encrypted and/or encoded information associated with one or more functions, as discussed in more detail below.

As shown in FIG. 1, a monitoring system 100 may include a global monitor 128. A global monitor 128 may be implemented using hardware, software or a combination of hardware. For instance, a global monitor 128 may be implemented as part of a microcontroller. A global monitor 128 may include a register and/or data store for temporarily storing data, a comparator for comparing data, programmed circuitry for performing one or more cryptographic operations and/or other components. A global monitor 128 may be in communication with one or more of the local monitors 116, 118, 120. As explained in more detail below, local monitors 116, 118, 120 may send to a global monitor 128 information pertaining to functions or tasks executed by one or more of their associated subsystems. The global monitor 128 may use this information to monitor, detect or track patterns at a higher system level. In other words, a local monitor 116, 118, 120 may detect faults or anomalies at a local level, while a global monitor 128 may detect system level faults over a period of time. In various embodiments, a global monitor 128 may be in communication with a diagnostics system (not shown).

It is understood that additional or alternate subsystems, along with additional or fewer local monitors, NVMs and/or configurations of each may be used within the scope of this disclosure.

Figure 2:
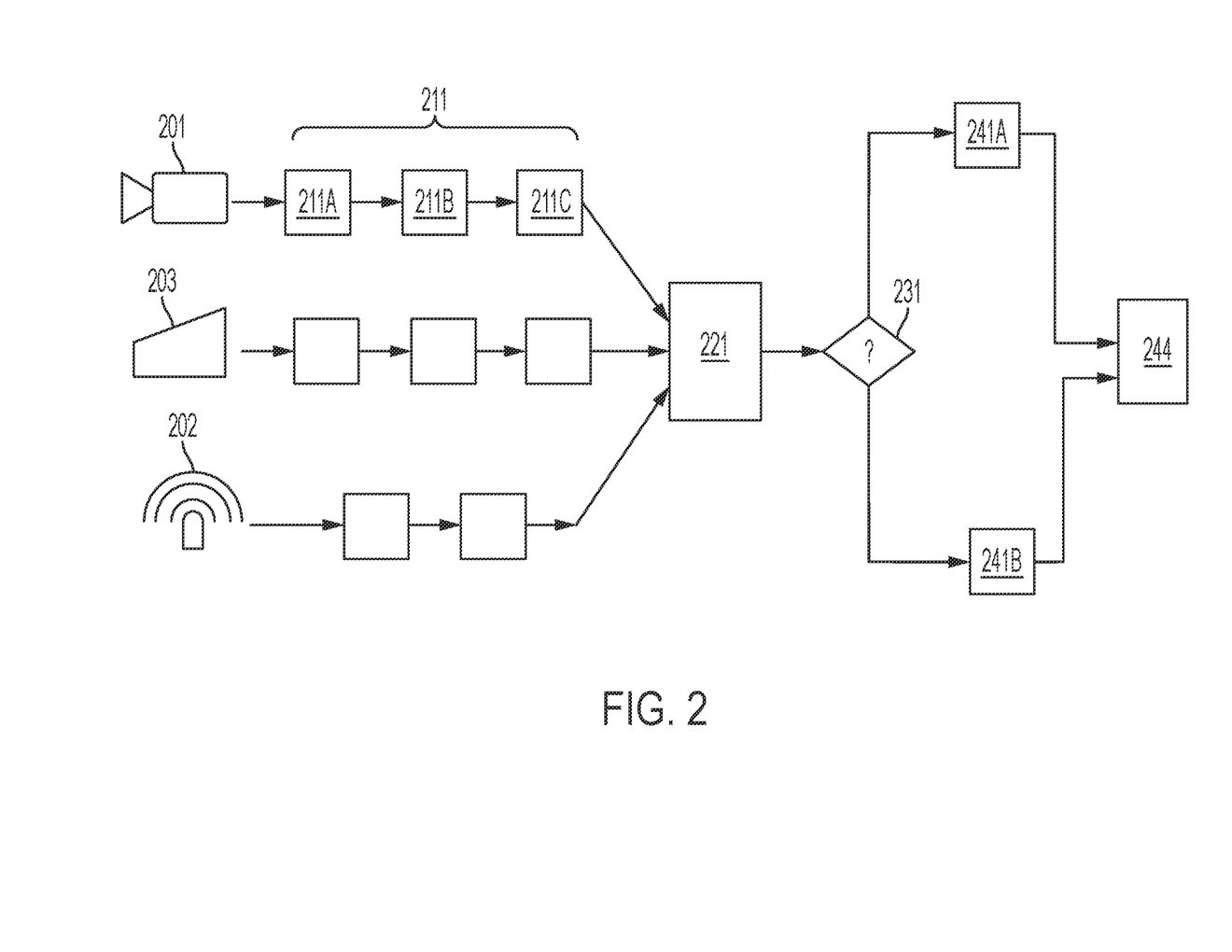
FIG. 2 illustrates example components of a robotic device such as an autonomous vehicle.

FIG. 2 illustrates example system components of a robotic device such as an autonomous vehicle. Using the vehicle as an example, the vehicle's operating system (which this document may refer to as an autonomous vehicle system, or AVS) will receive sensed data from a variety of sensors such as cameras 201 and LiDAR system 202, as well as from other components of the vehicle. Data also may be collected from operational components 203 of the vehicle, such as the vehicle's battery, drivetrain, turn signal, accelerator, or any other vehicle component, in which such data may include commands delivered to the components, measured parameters (such as current, voltage, pressure, torque, etc.) or parameters used in operation (such as rotations per minute, current applied, etc.). Data also may be received from one or more processes operating on the vehicle, such as a process that uses data from multiple sensors to detect the presence of a pedestrian near the vehicle.

The system will record the sensed and/or processed data in a data log, which also will include a timestamp at which the data associated with the sensor was collected and/or passed through the checkpoint. The system will use the collected data to perform an execution flow 211 that includes one or more processes (e.g., 211A-211C) on the data. The system will update the data log to include an identifier and time stamp for one or more additional checkpoints during the execution flow.

The system will perform a data fusion process 221 that fuses results from each execution flow, yielding fused data. The system will then use the fused data as an input for a decision process 231. The system will cause a component of the robotic device (e.g., 241A or 241B) to selectively take an action in response to an output of the decision process. The system will record the action, an action timestamp and the data logs for each sensor and/or process in a memory.

This document will use the term "signal" to describe data that is collected from one or more sensors or subsystems of the robotic device. A "primary signal" is a signal that is directly provided by a source or task. The primary signal will be measured or produced directly by some process running on the robotic device. For example, in an autonomous vehicle, primary signals may include current or voltage levels of subsystem components, data collected by sensors such as a LiDAR system, a measurement of how long sensor data took to reach the task that consumed it, or any of thousands of other parameters that the AVS may receive directly from a component. A "derived signal" is a signal that the system will calculate using inputs that are one or more primary signals and/or one or more other derived signals. Each process will generate primary signals at a regular frequency, and each the primary signal emitted by each process should have a value for each point in time. If a process fails to emit a signal value on its anticipated schedule, the system may assign it a value—invalid for the timestamp associated with the scheduled time that was missed. In this way, if a process doesn't regularly inform the diagnostics service that all is OK by emitting the signal on a regular schedule, the diagnostics service may presume that all is not OK with that process and it could be a cause of a fault.

Figure 3:
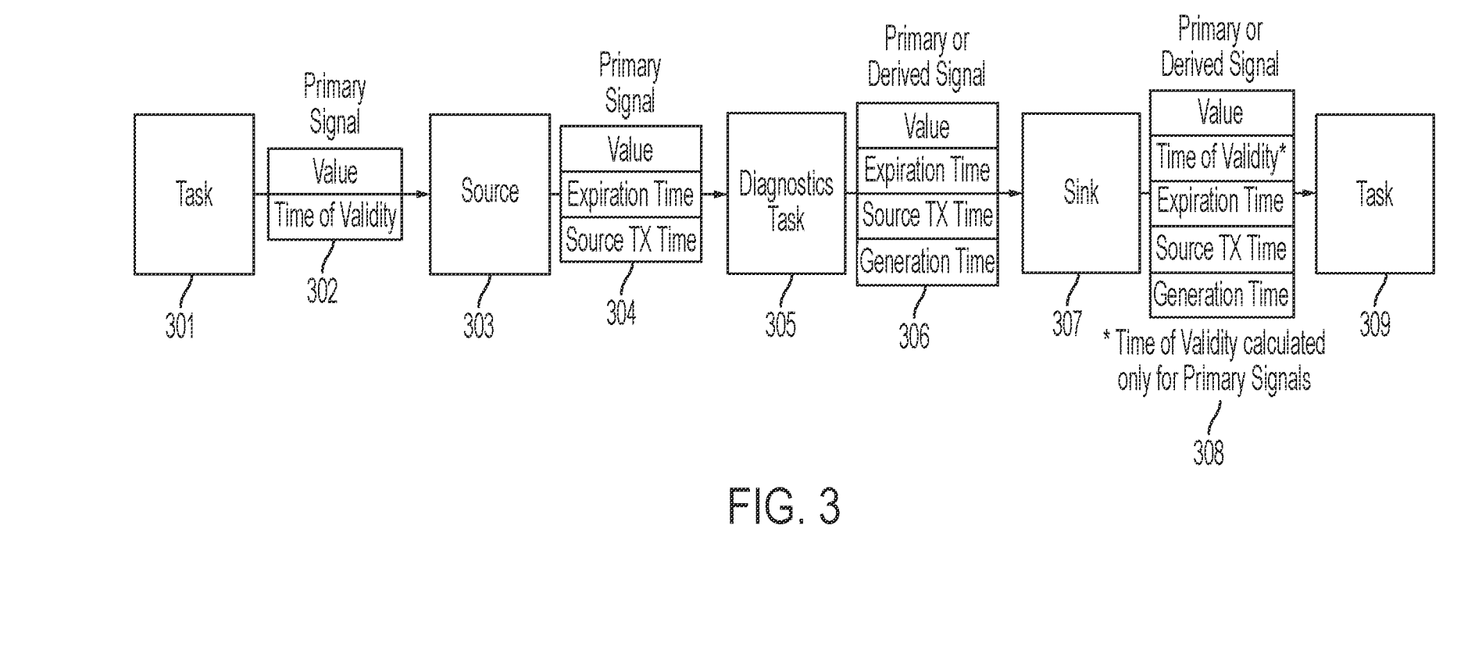
FIG. 3 illustrates various elements and uses of primary signals and derived signals in a robotic device monitoring system.

Referring to FIG. 3, a primary signal 302 may be received from a task 301 such as a process running on the robotic system. A primary signal 302 from a task 301 may include elements such as a value and a time of validity (ToV). ToV is a measurement that represents the time at which the signal's value was measured, or when the signal was generated. ToV is typically represented in system time—for example, in an autonomous vehicle, system time may be vehicle time, measured from T=0 at the time that the vehicle was turned on or first moved. The system may use ToV to determine the expiration time of a signal.

Each signal also will have a defined data type. Example data types include currently signed integer, unsigned integer, Boolean, floating point, enumeration, duration (time), character string, special (uniquely defined) types or other types.

A primary signal 304 also may be received from a source 303 such as an operator's command, a global positioning system (GPS), a diagnostics system or other input. Sources of signals are not limited to hardware but also may include software modules or subsystems that are running on the robotic system. A primary signal 304 from a task 301 may include elements such as a value and a ToV, along with a source TX time. The source TX time will be the time (typically current vehicle time) that the source assigns to the signal when it receives a call for the signal. The system may use source TX time to threshold stale values by sinks that are responsible for fault detection. For example, if a comparison of the current time to the source TX time of the update is larger than expected, it may indicate that the diagnostics service or some other process is not performing correctly. If diagnostics task processes signals from multiple sources together in a single batch, it may use a function of all of the signals' source TX times (such as the minimum source TX time from the various signals as the batch's source TX time) on output.

In addition, each time that the diagnostics service 305 generates an update to a primary or derived signal, it will attach the current vehicle time to the signal, which will represent a "generation time," as in signal 306. Generation time can provide a consistent and monotonic time which represents signal values as seen by the diagnostics task, which because of differing transmission times may be different than the order in which tasks sent the primary signals.

Each signal also may be assigned a lifetime, which is a duration of time for which the signal will be considered to be valid absent a further update. In addition, an "expiration time" of a signal may be set as the deadline for the valid use of its value in fault detection, as in signal 308. For primary signals, the expiration time may be set as: expiration_time=time_of_validity+lifetime, although other formulae could be used. For derived signals, the time of expiration may be inferred from the earliest time of expiration of any contributing causal signal. The fault detection function described below may perform causal inference on expiration time and produce a causal trace showing which primary signals determined the expiration time of the derived signals.

In addition to representing various types of data, signals may be considered to be "keyed" or "keyless." A "keyed" signal is a signal of a type that may be collected from multiple sources or tasks within the system, while a "keyless" signal will only have a single possible value because it is associated with only a single source or tasks. For example, a signal called CpuTemperature may represent the temperature of a central processing unit (CPU) chip in the system. However, the system may include many CPUs, and the system may separately measure the temperature of each CPU. Therefore, the CpuTemperature signal has multiple possible values depending on which CPU provided the signal. This document refers to the association of a signal value and its source as a "valence," and the CpuTemperature signal can therefore be considered to be multivalent. The keys for this signal will be an identifier of the source or task from which the signal's value is derived (such as CPU0, CPU1, CPU2, etc.). By way of another example, a signal called VehicleRotationVariance may represent the AVS's calculated uncertainty about the rotation (i.e., the directional bearing) of the vehicle in a referenced map. The AVS may derive this signal as a function of data collected from several sensors over time, and the VehicleRotationVariance signal may have different valences depending on which algorithm and/or which set of sensor data is used to determine the signal's value. Other examples include a NumDetectedPedestrians signal representing how many pedestrians are detected in proximity to the vehicle, or a NumPredictionUnknownActorClassifications signal representing a number of moving objects that are proximate to the vehicle but unable to be classified as a particular actor such as "pedestrian," "bicycle," or "vehicle."

By allowing signals to be multivalent, the system enables the definition of a derived signal that can be used regardless of the signal's valence. For example, if the CpuTemperature signal is a multivalent signal, then the system will know that a derived signal that contains a multivalent signal such as: CpuOverheating=CpuTemperature>CpuTemperatureThreshold also must be multivalent. The system will infer that the multivalent derived signal CpuOverheating has the same keys as its multivalent CpuTemperature component Thus, the system will create multiple keys for the derived signal, which in this example also will be CPU0, CPU1, CPU2, etc.

A sink 307 is a process that consumes or subscribes to a signal. Sinks 307 may choose which signals they will subscribe to, and they may inform the diagnostic system when they receive an update to a signal. This process will be described in more detail below in the discussion of FIG. 6.

Figure 4:
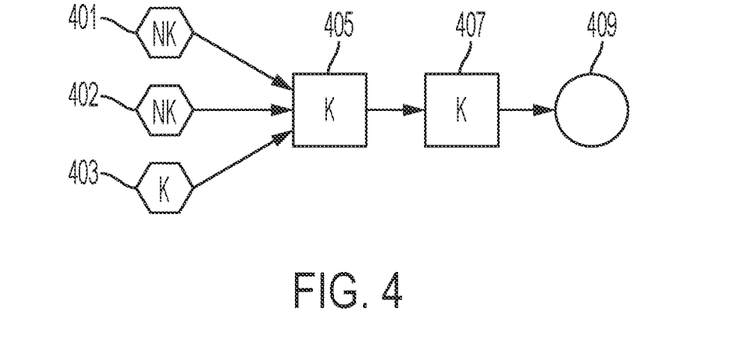
FIG. 4 illustrates how a system may generate derived signals from a collection of primary signals.
Figure 5:
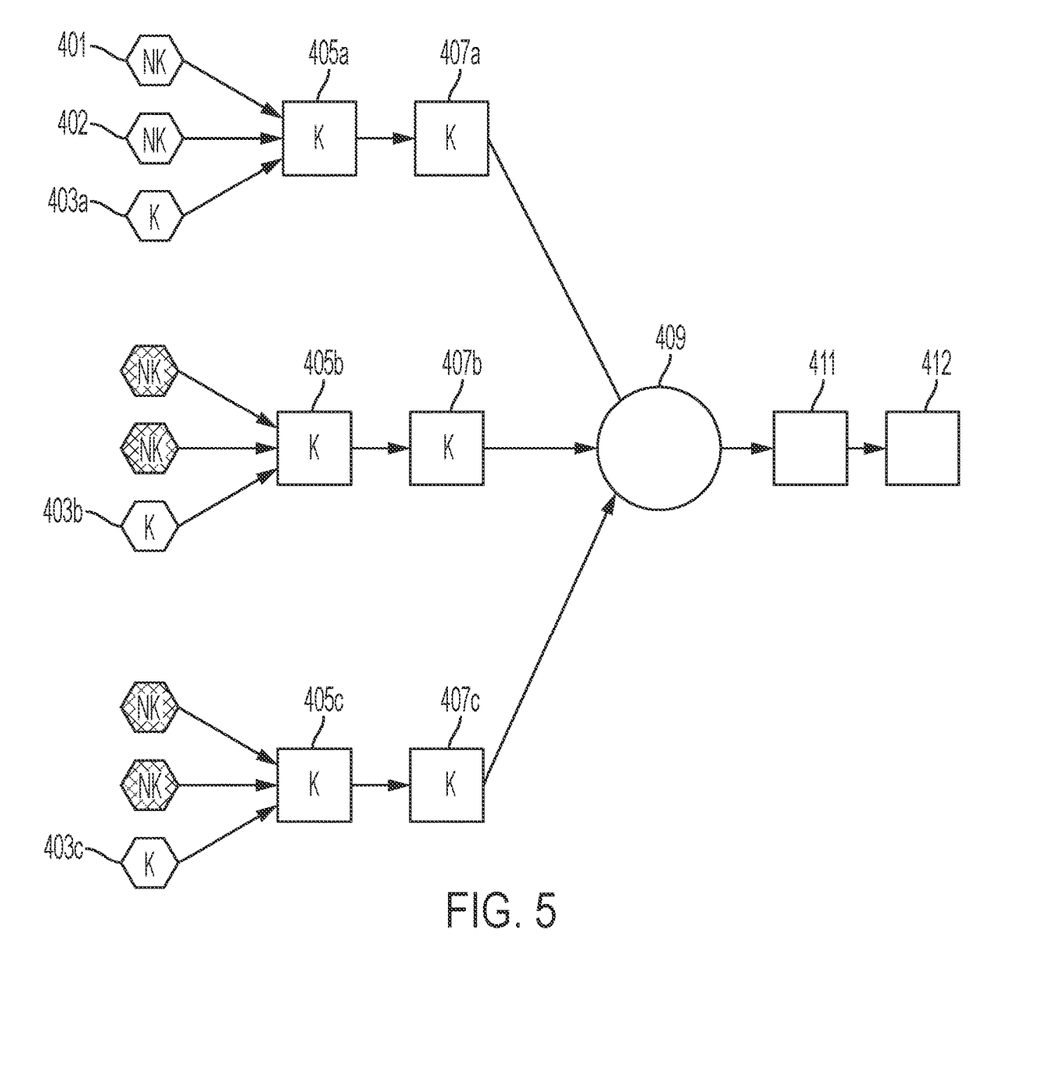
FIG. 5 illustrates how a system may generate derived signals when one or more components of the derived signals are multivalent signals.

FIGS. 4 and 5 illustrate, in a graph representation, how the system may use signal valences to simultaneously monitor multiple processes running on a vehicle with a single defined function (rather than multiple functions for each process). FIG. 4 illustrates an example function that the system may perform on various received signals. An example of such a function in an AVS may be a process that determines whether a fault may occur that could delay a stop command from being implemented by the vehicle. The AVS may receive any number of primary signals from various system components. Some of the primary signals may be keyless signals 401, 402, and others may be keyed signals 403 with multiple valences. The system will perform one or more functions on the primary signals to generate any number of derived signals 405, 407, each of which will be keyed signals because they are derived in part from a keyed input signal. (In FIG. 4, the functions are represented by arrows between nodes, and the signals generated by each function are represented by the square boxes.) The derived signals may be fed to a key aggregator 409 that collapses a group of the keys into a single function, using a group function as Sum, Min, Max or Mean.

The system may then use the output from the aggregator 409 to indicate whether the primary signals indicate that a fault is occurring that was caused by or relates to one or more of the signals that was fed to the aggregator 409. For example, if the value emitted by the aggregator matches an expected value, and if the timestamps of signals fed to the aggregator are valid, then the system may presume that the processes that emitted the signals yielded the aggregated signals are working properly and are not the cause of a fault. However, if the value emitted by the aggregator does not match the expected value, or if the timestamps of signals are not valid, then the system may presume that one of the processes in that result's signal derivation change is the source of the fault. It may then identify that process using a causal trace, as will be described in more detail below.

As noted above, each signal will have a data type. The data type of each primary signal will be specified in the code of the system. The data type of a derived signal may be inferred from the data types of the primary signals from which the derived signal has been derived. For example, if primary signals A and B have a signed integer data type, and signal C is derived as being A+B, then the data type of signal C may be inferred to be a signed integer data type. By comparison, if signal D is defined as "A>B" then D will have a Boolean type (true or false) rather than a signed integer type. A variety of other rules may be available to perform type inference.

FIG. 5 illustrates that when any of the primary signals is a keyed signal having multiple valences, the system may perform multiple instances of the function before aggregating the keys and determining the result. For example, as illustrated in FIG. 5, if keyed signal 403 has three valences, the system may create a first instance of the function that generates derived signals 405a, 407a using the non-keyed (keyless) signals 401, 402 and a first valence of the keyed signal 403a. The system may create a second instance of the function that generates derived signals 405b, 407b using the second valence of the keyed signal 403b. The system may create a third instance of the function that generates derived signals 405c, 407c using the third valence of the keyed signal 403c. If the keyed signal had additional valences, it would create an additional instance of the function for each additional valence. Each instance will be saved to a memory, such as in a graph format or a set of rules.

After replicating each instance of the function (such as by generating multiple instances of a graph), the system may specify a common aggregation node 409 to receive the outputs from each instance of the function. During runtime, the system will then deliver the derived signals from each instance of the function to the key aggregator 409 to generate a single aggregated derived signal 411 that incorporates all valences 403a . . . 403c of the keyed primary signal. The system may then use the output to determine whether the primary signals indicate that a fault is occurring that was caused by, or that relates to, one or more of the system elements from which the primary signals are derived.

During runtime of the robotic device, the monitoring system may receive an updated value for one or more of the keyed signals. If so, it will use each updated value to generate an updated aggregated signal 412 in real time. The value of the aggregated signal will change each time that the value for any primary signal in any instance of the function is changed.

The function may be stored by the diagnostic service as part of its executable code prior to runtime. The system may then use a set of configuration variables, typically received or stored in a separate configuration file, to allow configuration parameters to be changed without recompiling the executable code. As with signals, configuration variables may have defined types, or types that may be determined by inference. Configuration variables also may be monovalent or multivalent. Configuration variables may be used to specify a set of valid keys for multivalent signals. By way of example, in one of the expressions used above the CpuTemperatureThreshold variable may be a configuration variable. Thus, when the diagnostics service (such as 114 in FIG. 1) monitors processes running on the robotic device (as in step 309 of FIG. 3), the robotic device may load a set of configuration variables and use the configuration variables at runtime to insert one or more keys into one or more primary signals to derive one or more primary signals that relate to operation of a subsystem of the robotic device. If the signal is a multivalent signal, then the system may identify a first instance of the function that is associated with a first valence of the key, and it may retrieve the first valence of the key from the configuration file. It may then do the same for each additional instance of the function, using an additional valence of the key for each function instance.

The robotic device's operating system may use the results of the diagnostics activity to determine whether a fault or other condition exists that would require the robotic device to implement a safety-related corrective action. For example, in an autonomous vehicle a safety-related action may include preventing the vehicle from entering an autonomous mode, or if already in an autonomous mode determining an action to exit the autonomous mode. For example, if the diagnostics system determines that the value of the CpuOverheating derived signal is "true," then it may infer that a fault or other safety-related condition exists, and the vehicle's operating system may prevent the vehicle from entering autonomous mode and instead would require manual operation. If the vehicle is already in an autonomous mode, then to exit the autonomous mode the operating system may direct the vehicle to either switch to manual operation (if a driver is available) or come to a stop at the nearest safe parking location.

When the diagnostics system determines that a condition of interest (such as a fault, or another safety-related condition) exists, the use of primary signals and derived signals discussed above may assist the diagnostics system in determining the cause of the fault. (For simplicity, the discussion below will refer to any condition that would trigger a safety-related response action as a "fault," although such conditions are not limited to actual faults but also may include temporary aberrations and other conditions that are treated as faults.) The diagnostics system will essentially work backward through the network of computations to determine which input or inputs created the output that caused the fault. The system will do this by identifying the primary signal(s) that caused the fault and the pathway of intermediate calculations through which the signal(s) did so.

Figure 6:
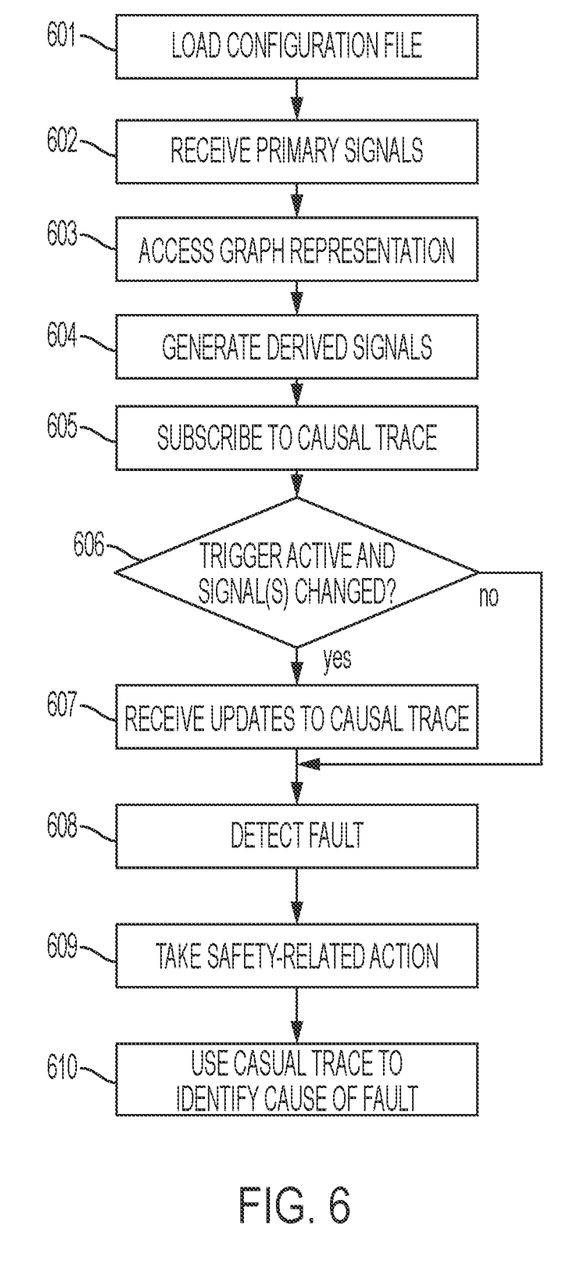
FIG. 6 illustrates a process of monitoring processes running on a robotic system and identifying causes of faults that occur in the processes.

FIG. 6 illustrates a process of monitoring processes running on a robotic system and identifying causes of faults that occur in the processes. As described above, upon startup the robotic device system may load a configuration file (step 601). Then, during runtime, a diagnostic system of the robotic system will receive primary signals from various processes running on the robotic system (step 602). The diagnostic system will access a graph representation of various functions as stored in memory (step 603), and it will generate one or more derived signals by performing the functions on one or more of the primary signals (step 604).

A sink (i.e. a task process) of the robotic system will subscribe to a causal trace (step 604). For example, a motion planning service of an AVS may be a sink that subscribes to a causal trace, as the motion planning service will be programmed to take a safety-related action when certain faults are detected. As the diagnostics service recalculates signals, it also keeps track of which subscribed-to signals have changed, and it assembles an output set for each subscribing sink. When an execution plan has completed and all affected signals recomputed, the diagnostics service will send any updates to the subscribing sinks (step 607). Optionally, updates will only be provided if (a) a change in signal value occurs, and (b) the causal trace includes a trigger that is active and the corresponding set of causal signals has changed (step 606). This can help to improve scalability, so that transmissions do not need to occur unless and until required.

The causal trace includes a value for a specified one of the derived signals and an identification of each signal from which the specified derived signal was derived. Upon detection of a fault in a subsystem of the robotic device, the diagnostics service 610 may use the causal trace to identify the source that caused the fault. Also, as described above, upon detection of a fault the robotic device, the device's operating system may cause the robotic device to take a safety-related action (step 609).

A causal trace is a sub-graph of signals that are causal of a particular traced signal. Causal traces are associated with one or more triggers, and the causal trace tracks changes to a causal trace when a trigger is active. The causal trace will be a subgraph of the overall graph of operations discussed above (as in FIGS. 4 and 5), but with only the nodes that actually contributed to the output at a given time. The causal trace for a group of processes will change constantly as values and timestamps change. The system may track changes to causal traces, and only transmit causal traces to the diagnostics service when a changes in a signal occur.

The trigger mentioned above will be a signal that acts as a trigger to indicate which signal will have an associated causal trace. As an example, the system may use a derived signal called "AllowedAutonomyLevel" that determines what mode of autonomous operation is currently permitted to implement in view of the current state of the system. This signal may have a trigger indicating that when something in the system goes wrong and autonomy is prohibited, a causal trace should be generated. In this case, the trigger may be labeled with a label such as AutonomyIsDisabled. Then, any time that the value of the AutonomyIsDisabled trigger signal is "true," the sink that subscribes to this signal will receive an update. But when the value of AutonomyIsDisabled equals "false," no updates may be generated because none are needed, thus saving processing resources.

As noted above, upon receipt of a causal trace the diagnostics service may use the causal trace to identify a process that caused the fault. To do this, the diagnostic service may determine whether a processing latency in the causal trace exceeds a threshold time value, or it may determine whether an uncertainty in the causal trace exceeds a threshold value.

Figure 7:
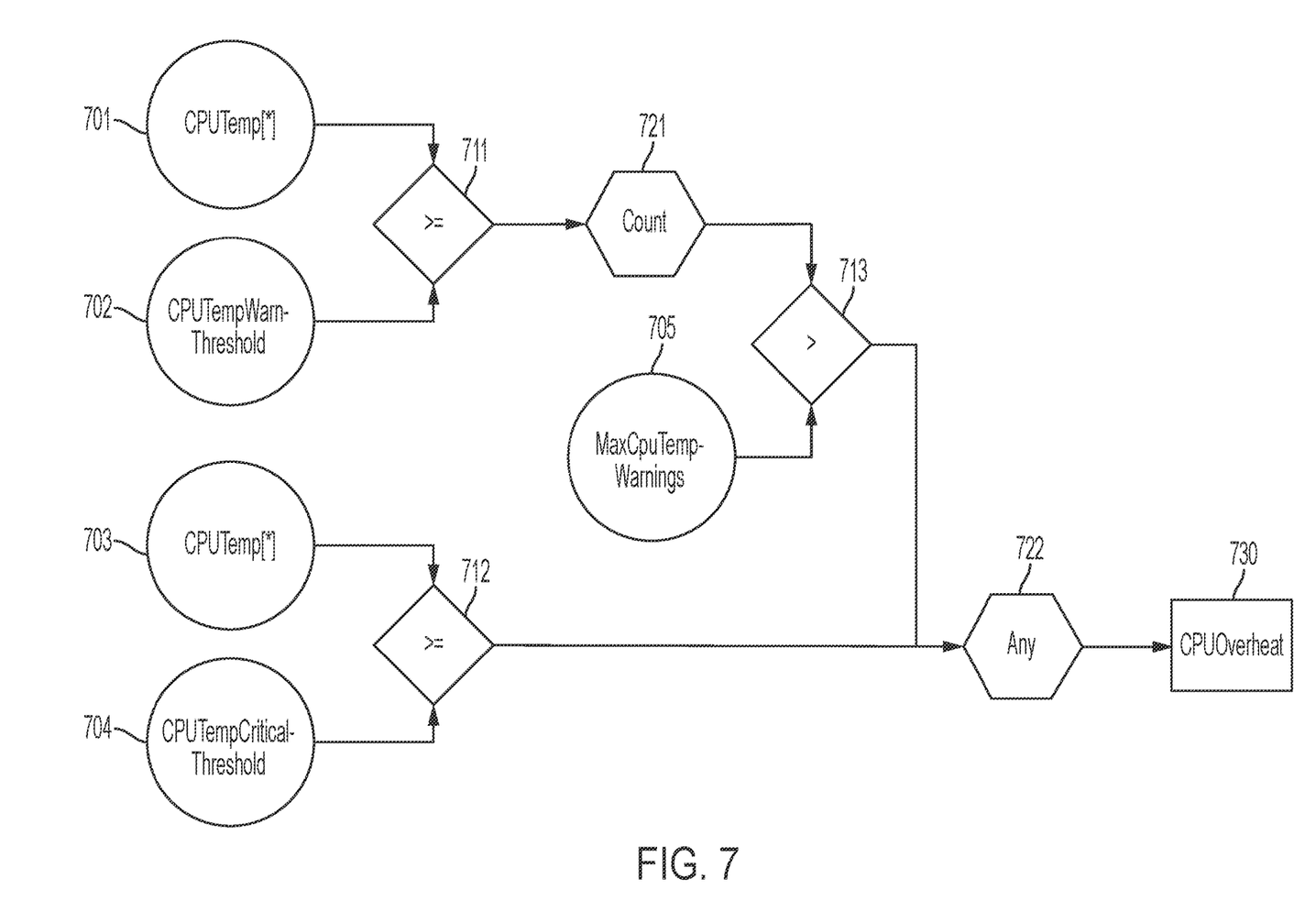
FIG. 7 illustrates an example function that a diagnostics system may implement.
Figure 8A:
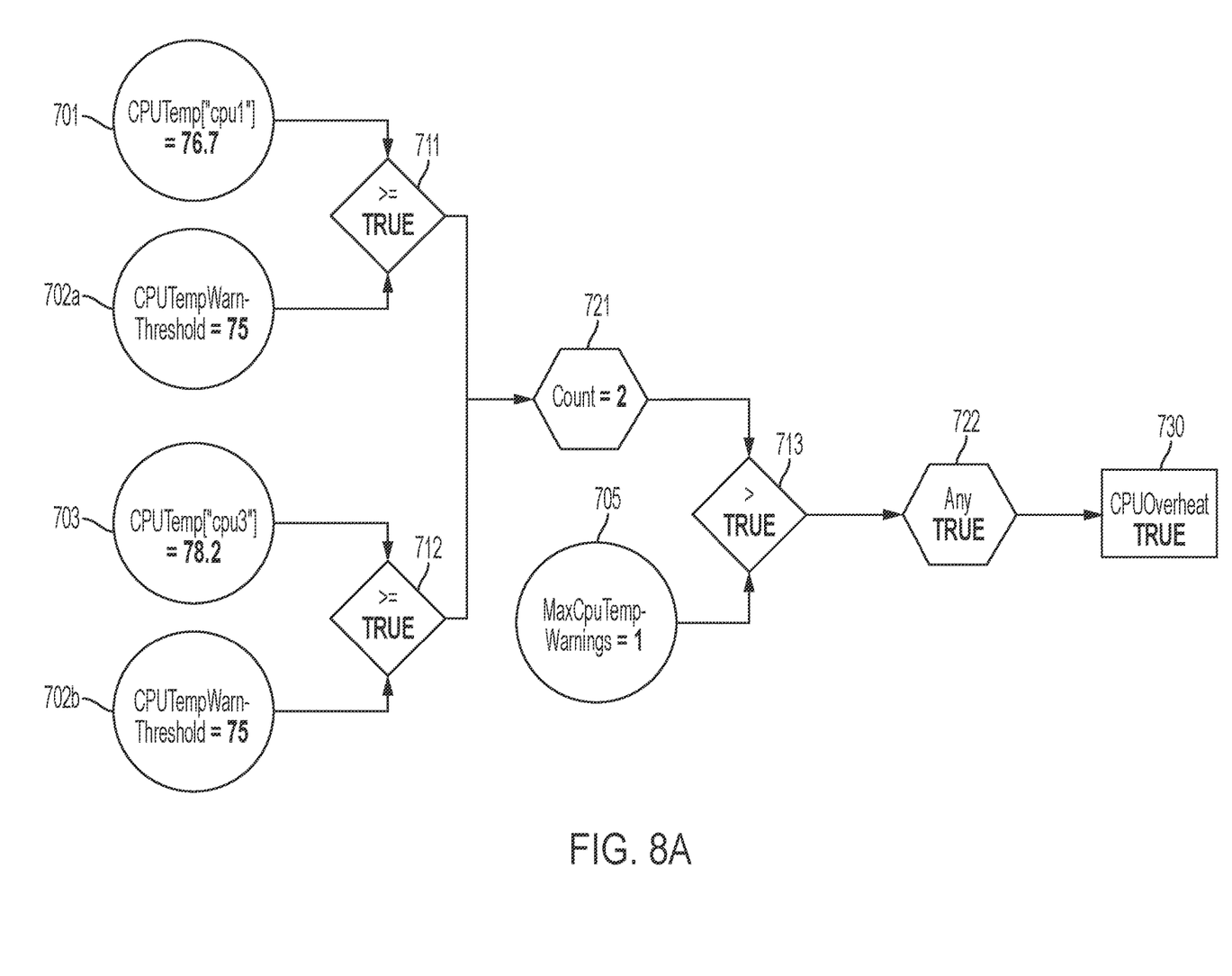
FIG. 8A illustrates an example of a causal trace following the rule definition of FIG. 7, with only causal primary signals shown.
Figure 8B:
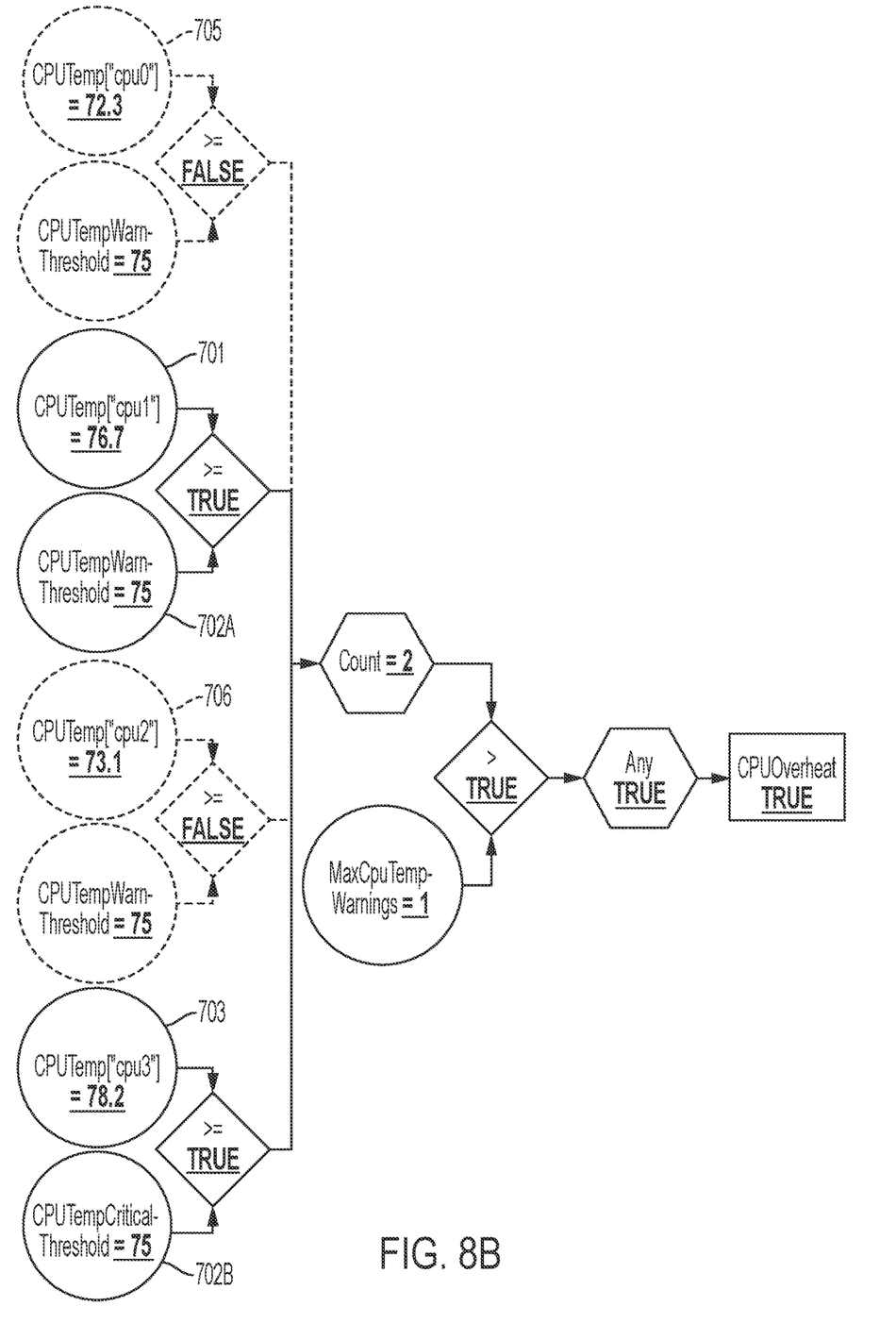
FIG. 8B shows the causal trace of FIG. 8A, but with non-causal primary signals also shown.

By way of example, FIG. 7 illustrates an example algorithm that may serve as a function (i.e., a logic definition of rules) that a diagnostics service may use to analyze a causal trace, while FIGS. 8A and 8B illustrate an example of a causal trace to which the function may be applied. Referring to FIG. 7, a group of primary signals (represented by circles) include CPUTemp 701 and 703, CPUTempWarnThreshold 702, CPUTempCriticalThreshold 704, and MaxCpuTempWarnings 705 signals. The primary signals serve as inputs to functions that result in derived signals (represented by diamonds) 711, 712, 713. Hexagons are key aggregators 721, 722, while the square CPUOverheat is the output 730, which is also a derived signal. This implements the following logic: if any CPU's temperature exceeds a critical threshold, or if more than MaxCpuTempWarnings exceed a warning threshold, then the CPUOverheat derived signal=true (or active). The robotic system may store a function such as that shown in FIG. 7 in memory prior to runtime—that is, prior to movement of the robotic device through an environment—without the specific variables such as CPUTemp, CPUOverheat, etc.

FIG. 8A illustrates an example causal trace that follows the logic of FIG. 7. In this causal trace, primary signals CPUTemp 701, 703 indicate the temperature values of two central processing units (CPUs). CPUTempWarnThreshold 703, CPUTempCriticalThreshold 704 and MaxCpuTempWarnings 705 signals. The CPUTempWarnThreshold 702 for each CPU is 75 degrees Fahrenheit. In this case the value for each CPUTemp 701, 703 signal (76.7 and 78.2 degrees Fahrenheit, respectively) is higher than the CPUTempWarnThreshold 702, so derived signals 711, 712 both have a value of "true." Thus, the value of the CPUOverheat 730 value is also true. The system may load the configuration variables (CPUTemp, CPUOverheat, etc.) into the function at runtime, when the vehicle or other robotic system is turned on, or when movement of the robotic system is initiated.

Note that in practice, more than two CPUs will likely be part of the system. However, in the graph only the CPUs that are causal of the CPUOverheat output being true are shown. In addition, the "critical" pathway of FIG. 7 is omitted because no CPUs exhibit temperature values that are in a critical overheat temperature range, only a warning temperature range. Thus, only nodes that are causal of the output being true are illustrated in this causal trace. In an alternate embodiment, nodes that are not causal of the output may be part of the trace, but they appear in a different format than the causal nodes. For example, in FIG. 8B, the causal trace of FIG. 8A is repeated with non-causal signals 705, 706 shown with dashed lines instead of solid lines. Non-causal signals 705, 706 are non-causal because their values are less than the CPUTempWarnThreshold.

This process may consider both "value causation" and "time causation," as each signal will have both a value and a timestamp associated with it. Timestamps can be useful because if data is stale, the operating system may cause the robotic device to take an action. (For example, an autonomous vehicle may exit an autonomous mode if data has not updated as quickly as expected.) The signals' timestamps allow the operating system to determine which signal (and thus which source) was late to update, and that source may be the cause of the problem. If all signals are current, then the system may use the values of the signals to determine the source of a problem.

Figure 9:
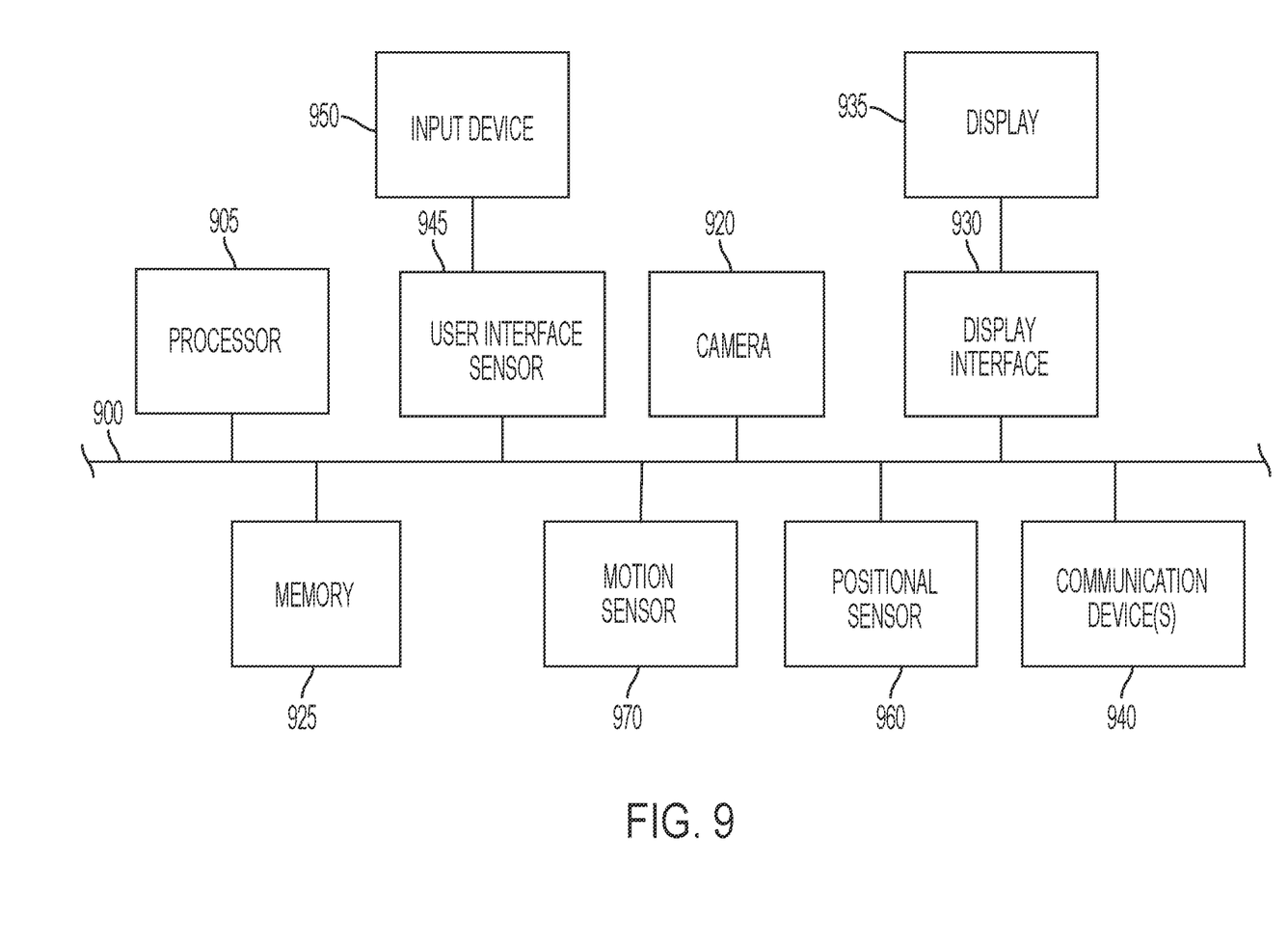
FIG. 9 is a block diagram of elements of a computing device on which the various systems and methods in this document could be implemented.

FIG. 9 depicts an example of internal hardware that may be included in any of the electronic components of the system, such as internal processing systems, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, an RFID tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 that can capture video and/or still images.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes;

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "execution flow" refers to a sequence of functions that are to be performed in a particular order. A function refers to one or more operational instructions that cause a system to perform one or more actions. In various embodiments, an execution flow may pertain to the operation of an automated device. For example, with respect to an autonomous vehicle, a particular execution flow may be executed by the vehicle in a certain situation such as, for example, when the vehicle is stopped at a red stop light that has just turned green. For instance, this execution flow may include the functions of determining that the light is green, determining whether there are any obstacles in front of or in proximity to the vehicle and, only if the light is green and no obstacles exist, accelerating. When a subsystem of an automated device fails to perform a function in an execution flow, or when it performs a function out of order in sequence, the error may indicate that a fault has occurred or that another issue exists with respect to the execution flow.

An "automated device monitoring system" is a set of hardware that is communicatively and/or electrically connected to various components (such as sensors) of an automated device to collect status or operational parameter values from those components. An automated device monitoring system may include or be connected to a data logging device that includes a data input (such as a wireless receiver) that is configured to receive device operation data directly or indirectly from the device's components. The monitoring system also may include a processor, a transmitter and a memory with programming instructions. A monitoring system may include a transmitter for transmitting commands and/or data to external electronic devices and/or remote servers. In various embodiments, a monitoring system may be embedded or integral with the automated device's other computing system components, or it may be a separate device that is in communication with one or more other local systems, such as, for example in the context of an autonomous vehicle, an on-board diagnostics system.

The invention claimed is:

1. A method for operating a robotic system, comprising:
receiving, by a processor, a plurality of first signals that each comprise data produced by at least two sources of the robotic system and first keys comprising numerical values respectively defined by identifiers for the at least two sources;
generating, by the processor, second signals derived from the plurality of signals;
combining, by the processor, numerical values of second keys of the second signals to produce a third key;
detecting, by the processor, an existence of an operational condition in the robotic system when the third key has a numerical value different than an expected numerical value; and
causing, by the processor, a given action to be taken by the robotic system responsive to the existence of the operational condition.

2. The method according to claim 1, wherein the at least two sources comprise different processes running on the robotic system or different electronic devices internal to the robotic system.

3. The method according to claim 1, wherein the third key is a sum of the numerical values of the second keys, a minimum numerical value of the second keys, a maximum numerical value of the second keys, or a mean of the numerical values of the second keys.

4. The method according to claim 1, wherein the generating comprises performing a given function to produce each of the second signals based on one of the first keys that is different than ones of the first keys used to produce other the second signals.

5. The method according to claim 1, wherein the given action comprises transitioning operational modes of the robotic system, disabling certain operations of the robotic system, or movement of at least a portion of the robotic system.

6. The method according to claim 1, further comprising identifying, by the processor from the at least two sources, a source that caused the existence of the operational condition using a causal trace.

7. The method according to claim 6, wherein the identifying comprises comparing a processing latency of the causal trace to a threshold value or comparing an uncertainty value in the causal trace to a threshold value.

8. The method according to claim 6, wherein the causal trace comprises only sources of the at least two sources that are causal to the existence of the operational condition.

9. The method according to claim 6, wherein the at least two sources are provided in different formats to indicate relative levels of causality for the existence of the operational condition.

10. The method according to claim 9, wherein the levels of causality comprise causal and non-causal.

11. A system, comprising:
a memory; and
at least one processor coupled to the memory and configured to:
receive a plurality of first signals that each comprise data produced by at least two sources of the robotic system and first keys comprising numerical values respectively defined by identifiers for the at least two sources;

generate second signals derived from the plurality of signals;

combine numerical values of second keys of the second signals to produce a third key;

detect an existence of an operational condition in the robotic system when the third key has a numerical value different than an expected numerical value; and cause a given action to be taken by the robotic system responsive to the existence of the operational condition.

12. The system according to claim 11, wherein the at least two sources comprise different processes running on the robotic system or different electronic devices internal to the robotic system.

13. The system according to claim 11, wherein the third key is a sum of the numerical values of the second keys, a minimum numerical value of the second keys, a maximum numerical value of the second keys, or a mean of the numerical values of the second keys.

14. The system according to claim 11, wherein the second signals are generated by performing a given function to produce each of the second signals based on one of the first keys that is different than ones of the first keys used to produce other the second signals.

15. The system according to claim 11, wherein the given action comprises transitioning operational modes of the robotic system, disabling certain operations of the robotic system, or movement of at least a portion of the robotic system.

16. The system according to claim 11, wherein the processor is further configured to identify a source from the at least two sources that caused the existence of the operational condition using a causal trace.

17. The system according to claim 16, wherein the source is identifies by comparing a processing latency of the causal trace to a threshold value or comparing an uncertainty value in the causal trace to a threshold value.

18. The system according to claim 16, wherein the causal trace comprises only sources of the at least two sources that are causal to the existence of the operational condition.

19. The system according to claim 16, wherein the at least two sources are provided in different formats to indicate relative levels of causality for the existence of the operational condition.

20. The system according to claim 19, wherein the levels of causality comprise causal and non-causal.

21. A non-transitory computer-readable medium having instructions stored thereon that, when executed by at least one computing device, cause the at least one computing device to perform operations comprising:

receive a plurality of first signals that each comprise data produced by at least two sources of the robotic system and first keys comprising numerical values respectively defined by identifiers for the at least two sources;

generate second signals derived from the plurality of signals;

combine numerical values of the second keys of the second signals to produce a third key;

detect an existence of an operational condition in the robotic system when the third key has a numerical value different than an expected numerical value; and cause a given action to be taken by the robotic system responsive to the existence of the operational condition.

* * * * *